United States Patent
Towe et al.

(10) Patent No.: US 6,193,869 B1
(45) Date of Patent: Feb. 27, 2001

(54) MODULAR APPARATUS FOR THE DEMINERALIZATION OF LIQUIDS

(75) Inventors: Ian Glenn Towe, Alton; David Florian Tessier, Guelph; Mark Philip Huehnergard, Kitchener, all of (CA)

(73) Assignee: Glegg Water Conditioning, Inc., Guelph (CA)

( * ) Notice: Subject to any disclaimer, the term of this patent is extended or adjusted under 35 U.S.C. 154(b) by 0 days.

(21) Appl. No.: 09/117,775

(22) PCT Filed: Feb. 10, 1997

(86) PCT No.: PCT/CA97/00088

§ 371 Date: Aug. 6, 1998

§ 102(e) Date: Aug. 6, 1998

(87) PCT Pub. No.: WO97/28889

PCT Pub. Date: Aug. 14, 1997

(30) Foreign Application Priority Data

Feb. 9, 1996 (GB) .................................... 9602625

(51) Int. Cl.[7] .................................................. B01D 61/48
(52) U.S. Cl. ............................................ 204/632; 204/633
(58) Field of Search ...................................... 204/632, 633

(56) References Cited

U.S. PATENT DOCUMENTS 2,943,989   7/1960  Kollsman .
3,149,062   9/1964  Gottschal et al. .
4,849,102   7/1989  Latour et al. .

FOREIGN PATENT DOCUMENTS 503651   9/1992  (EP) .
535546   4/1993  (EP) .
776469   6/1957  (GB) .

Primary Examiner—Arun S. Phasge
(74) Attorney, Agent, or Firm—Arne I. Fors

(57) ABSTRACT

A modular sysTem for the demineralization of aqueous liquids comprising a plurality of modular units, each of the modular units being encapsulated and having a cathode proximate a first end of the modular unit and an anode proximate the opposite end of said modular, a plurality of alternating diluting and concentrating compartments positioned between the cathode and the anode, and ion exchange material positioned within the diluting compartments. Each of the diluting compartments has a compartment spacer with an elongated central cavity and a plurality of fine slit openings at each end adjacent the cavity. The ion exchange means comprise a porous and permeable continuous phase of cation or anion exchange resin particles and a porous and permeable dispersed phase of clusters of the other of the cation or anion exchange resin particles. Releasable connecting means are provided to interconnect the modular units in the system to allow for facile substitution of modular units for servicing and to permit modification of flow capacity requirements by increasing or decreasing the total number of modular units in the system.

19 Claims, 12 Drawing Sheets

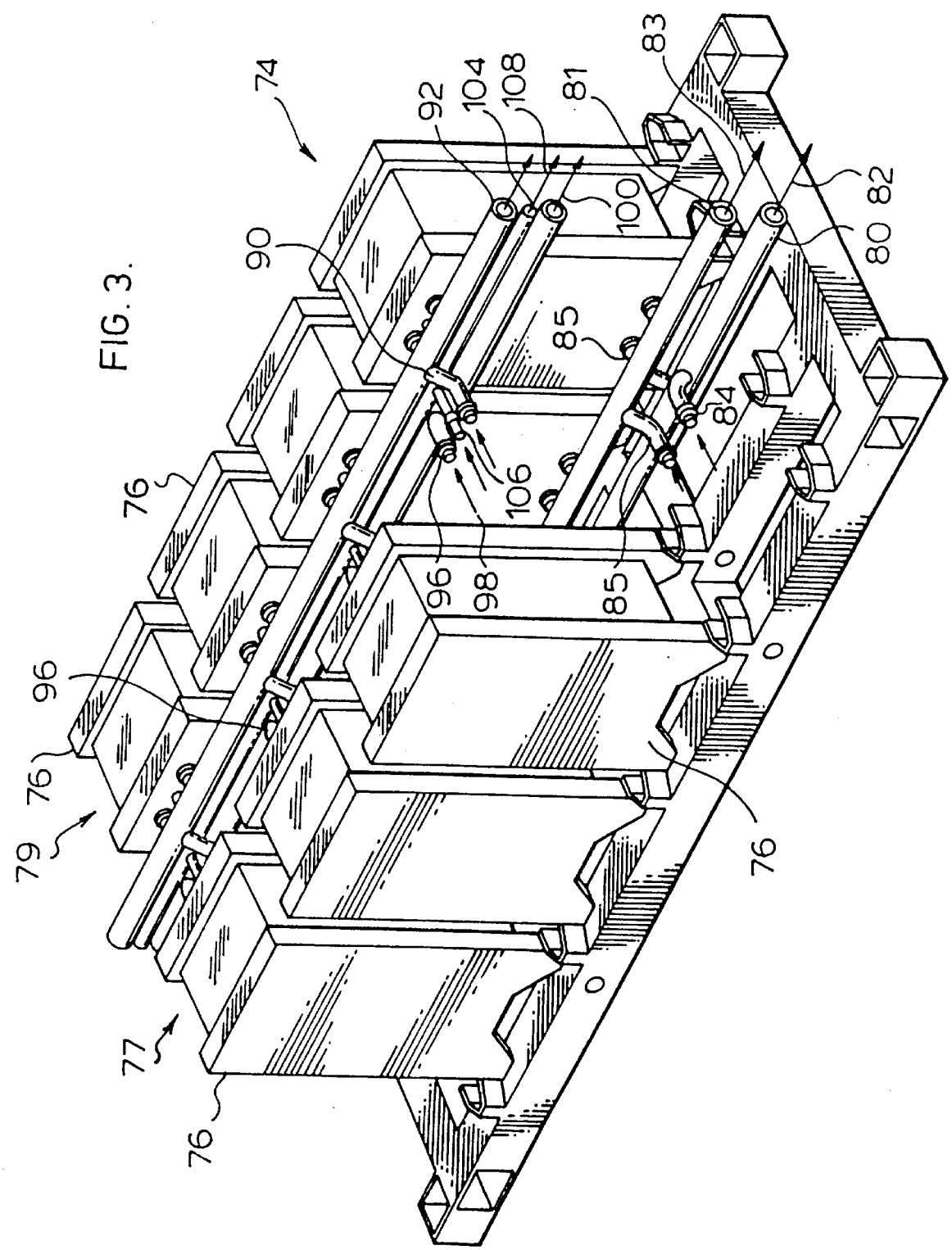

MODULAR APPARATUS FOR THE DEMINERALIZATION OF LIQUIDS

This application is a 371 of PCT/CA97/00088 filed, Feb. 10,1997.

FILED OF INVENTION

This invention relates to an apparatus for the demineralization of liquids and, more particularly, relates to an apparatus comprised of modular units for the demineralization of liquids.

BACKGROUND OF THE INVENTION

The purification of liquid has become of great interest in many industries. In particular, pure water is used for many industrial purposes rather than merely as drinking water. For example, pure water is used in processes for producing semiconductor chips, in power plants, in the petro chemical industry and for many other purposes.

Ion exchange resins, reverse osmosis filtration and electrodialysis techniques have been used to reduce the concentration of particular ions in a liquid.

Electrodeionization apparatus have recently been used with more frequency to reduce the concentration of ions in a liquid. The term "electrodeionization" generally refers to an apparatus and a process for purifying liquids which combine ion exchange resins, ion exchange membranes and electricity to purify the liquids. An electrodeionization module comprises alternating arrangements of cation permeable membranes and anion permeable membranes defining compartments therebetween. In alternating compartments, there is provided ion exchange resin beads. Those compartments are known as diluting compartments. The compartments which generally do not contain ion exchange resin are known as the concentrating compartments. Ions migrate from the diluting compartments through ion exchange beads and ion permeable membranes into the concentrating compartments by the introduction of current. The liquid flowing through the concentrating compartments is discarded or partially recycled and the purified liquid flowing through the diluting compartments is recovered as demineralized liquid product.

Electrodialysis apparatus are similar in configuration to electrodeionization apparatus. The main difference between electrodialysis apparatus and electrodeionization apparatus is that electrodialysis apparatus do not use ion exchange resin to aid in the removal of ions in the liquid passed through the diluting compartment. Often electrodialysis apparatus utilize membrane structures extending into the diluting compartments to aid in the removal of ions from a liquid.

There are two general configurations for electrodeionization and electrodialysis apparatus: first, a plate and frame configuration, and second, a spiral-wound configuration.

U.S. Pat. No. 4,925,541 which issued May 15, 1990 to Giuffrida et al. discloses a plate and frame electrodeionization apparatus and method. The method for removing ions from a liquid in an electrodeionization apparatus is carried out in an electrodeionization apparatus which has a number of subcompartments in the diluting compartments. A mixture of anion exchange resin and cation exchange resin is contained within the subcompartments. The subcompartments are formed by a plurality of ribs extending along the length of the diluting or ion depletion compartments.

U.S. Pat. No. 4,636,296 which issued Jan. 13, 1987 to Kunz discloses another embodiment of plate and frame apparatus and method for the demineralization of aqueous solutions in which an aqueous liquid is passed through alternating separate layers of cation exchange resin and anion exchange resin.

Plate and frame apparatus are large in size and typically suffer from leaks because of the difficulty of sealing large vessels. Also, the units often are oversize because of inflexibility in designing for capacity, necessitating undesirably high capital and operating costs.

U.S. Pat. No. 5,376,253 which issued Dec. 27, 1994 to Rychen et al. discloses an apparatus for the electrochemical desalination of aqueous solutions. The apparatus has a wound or spiral arrangement of anion and cation permeable membranes. Such apparatus are prone to leakage and are relatively difficult to manufacture.

It is tedious to increase or vary the total output capacity of purified liquid for plate and frame configurations because it involves disassembly, insertion of additional ion permeable membranes, and installation of longer tie-bars to assemble the apparatus together. It is also tedious if not impossible to increase or vary the total output capacity of purified liquid for spiral configurations because it involves disassembly and the insertion of a longer or shorter arrangement of anion and cation permeable membranes.

It is desirable to easily vary the total output capacity for pure liquid in apparatus for the demineralization of liquids. It is also desired to have an electrochemical cell for electrodialysis and electrodeionization apparatus which is relatively easy to situate in an existing water treatment system.

SUMMARY OF THE INVENTION

The disadvantages of the prior art may be overcome by providing a modular system apparatus for the demineralization of liquids which has a plurality of modular units for the demineralization of liquids and which is relatively easily assembled and disassembled for replacement of modular units or for increasing or decreasing design flow capacity by adding or deleting modular units in the system.

In its broad aspect, the apparatus for the demineralization of liquids of the present invention comprises a plurality of modular units for the demineralization of aqueous liquids arranged in parallel with the flow of a liquid and adapted to remove ions from the liquid. The apparatus is a modular system comprised of functional building blocks which can be readily increased or decreased in size and volumetric capacity by increasing or decreasing the number of these building blocks, i.e. modular units. Each of the modular units or cells has a cathode and an anode and means for applying an electrical voltage between the anode and the cathode. A plurality of alternating diluting or demineralizing compartments and concentrating compartments are positioned between the cathode and the anode. Ion exchange material is positioned within the diluting compartments and may be positioned within the concentrating compartments. The apparatus has means for passing a first liquid to be purified through the diluting compartments and means for passing a second liquid through the concentrating compartments for accepting ions from the first liquid. Each modular unit also has means for passing an electrolyte to and from the cathode and anode, means for recovering the purified liquid from the diluting compartments and means for removal of the concentrated liquid from the unit.

In another aspect of the invention, each of the modular units is an electrodeionization apparatus. In another aspect of the invention, each of the modular units is an electrodialysis apparatus. The modular units are in parallel with each other and have quick release securement means to allow facile release of the modular units from the system.

In a preferred embodiment, the portable modular unit for use in a modular system for demineralizing aqueous liquids comprises a rigid, compact housing, said housing having a pair of opposite end plates, a pair of opposite side plates, a top plate and a bottom plate, and connector means for joining said end plates to the side and plates and for securing the top and bottom plates thereto to form a liquid-tight encapsulating enclosure; said housing containing an anode compartment having an anode and a cathode compartment having a cathode, a plurality of cation exchange membranes and anion exchange membranes which are alternately arranged between the anode compartment and the cathode compartment to form demineralizing compartments each defined by a demineralizing compartment spacer having an anion exchange membrane on the anode side and by a cation exchange membrane on the cathode side, and concentrating compartments each defined by a concentrating compartment spacer having a cation exchange membrane on the anode side and by an anion exchange membrane on the cathode side, and a porous and permeable ion exchanger filling said demineralizing compartments, and means for releasably connecting the modular unit to a piping system in a modular system whereby the modular unit can be removed from or added to the modular system.

Each demineralizing compartment comprises a demineralizing compartment spacer having an elongated central cavity for receiving the porous and permeable ion exchanger, said spacer having a liquid inlet port at one end and a liquid outlet port at the opposite end, a plurality of fine slit openings formed in the spacer at each end adjacent the cavity, and at least one channel in the spacer at each end for interconnecting the liquid inlet port to the fine slit openings adjacent the cavity and for connecting the liquid outlet port to the fine slit openings, whereby an aqueous liquid can be flowed through the porous and permeable ion exchanger filling the demineralizing compartment. The ion exchanger preferably a porous and permeable continuous phase of one of cation exchange resin particles or anion exchange resin particles and a porous and permeable dispersed phase of clusters of the other of the cation exchange resin particles or the anion exchange resin particles in the continuous phase.

Each of the end plates and the side plates of the modular unit has an outer surface and has a plurality of transverse upstanding reinforcing ribs equispaced along the said outer surface formed integral therewith, and a cover plate substantially co-extensive with an attached to the distal edges of the reinforcing ribs to form a rigid box structure therewith for stiffening and reinforcing the plates from internal pressure.

Each said side plate has a socket formed integral therewith on the outer surface adjacent opposite side edges thereof as an extension of a transverse rib at each end thereof, each said socket having a longitudinal hole therein for loosely receiving a threaded bolt shank and a slot intersecting the hole adapted to receive a nut compatible with the threaded bolt shank, said slot having an interior shape such as a part hexagonal shape for receiving the nut in axial alignment with the bolt for threading the bolt into the nut.

Each said end plate has a boss formed on the outer surface adjacent opposite sides thereof at each end of a transverse rib, each said boss having a hole for receiving a bolt in alignment with a mating socket in a side plate.

The modular system for demineralizing aqueous liquids comprises a plurality of said portable modular units in which the portable modular units are arranged in parallel, a piping system for feeding an aqueous liquid to be demineralized in parallel to the modular units and for removing a demineralized aqueous liquid and a concentrated waste liquid in parallel from the modular units, means for applying an electrical voltage between the anode and the cathode, and means for removably connecting the modular units to the piping system for facile adding of a modular unit to the system or removal of the modular unit from the system.

The apparatus of the invention provides a number of advantages including the following: 1. the electrical connections between the modular units allow for simple wiring of the apparatus; 2. the quick disconnection of the modular units enables the modular units to be easily serviced or replaced; 3. the modular units simplify assembly and disassembly of the entire apparatus; 4. the relatively small size of the modular units allows for encapsulation of the units, thereby enhancing the integrity of the units and minimizing leakage; and 5. the total output capacity of purified liquid is easily increased or decreased to suit design flow requirements by adding or removing modular units in a system assembly of the units.

BRIEF DESCRIPTION OF THE DRAWINGS

The present invention will now be described with reference to the accompanying drawings, in which:

FIG. 3 is a perspective view of an embodiment of the apparatus of the invention for the demineralization of liquids; with a modular unit removed for clarity of illustrations;

DETAILED DESCRIPTION OF THE PREFERRED EMBODIMENT

Figure 1:
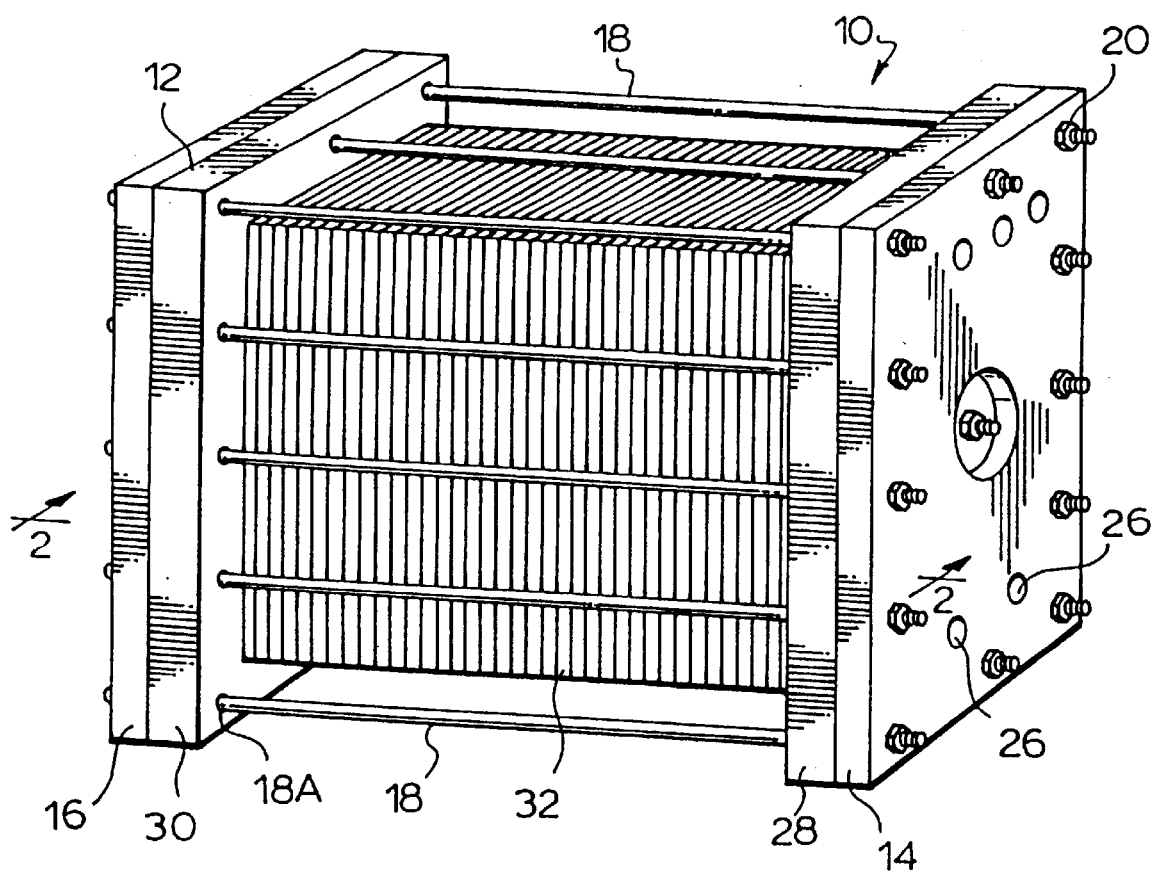
FIG. 1 is a perspective view of a prior art electrodeionization 5 apparatus.

Referring to FIG. 1, a prior art plate and frame electrodeionization apparatus 10 is shown whereby ions may be removed from a liquid. In the preferred embodiment, ions such as sodium and chloride are removed from water.

The electrodeionization apparatus 10 has a rectangular frame 12. The frame 12 comprises a rigid front plate 14 and a rigid back plate 16 formed of metal. The front plate 14 and the back plate 16 are joined together by a number of tie-bars or bolts 18. Each tie-bar 18 is inserted into a hole 20 located equispaced about the periphery of the front plate 14 and inserted into corresponding holes 18a in back plate 16. A cathode depicted by numeral 22 (FIG. 2) is located proximate the front plate 14 in a cathode compartment 23 and an anode depicted by numeral 24 is located proximate the back plate 16 in an anode compartment 25.

Openings 26 are located in the front plate 14 to allow liquid to enter the electrodeionization apparatus 10 for treatment. Insulating electrode block 28 forming and electrode compartment abuts the perimeter of the front plate 14 and insulating electrode block 30 forming an electrode compartment continuously abuts the perimeter of the back plate 20. The electrodeionization apparatus 10 has a plurality of alternating cation permeable membranes and anion permeable membranes depicted by numeral 32 between the insulating electrode blocks 28 and 30. The cation permeable membranes and anion permeable membranes 32 define the boundaries of alternating concentrating and diluting compartments, to be described.

Figure 2:
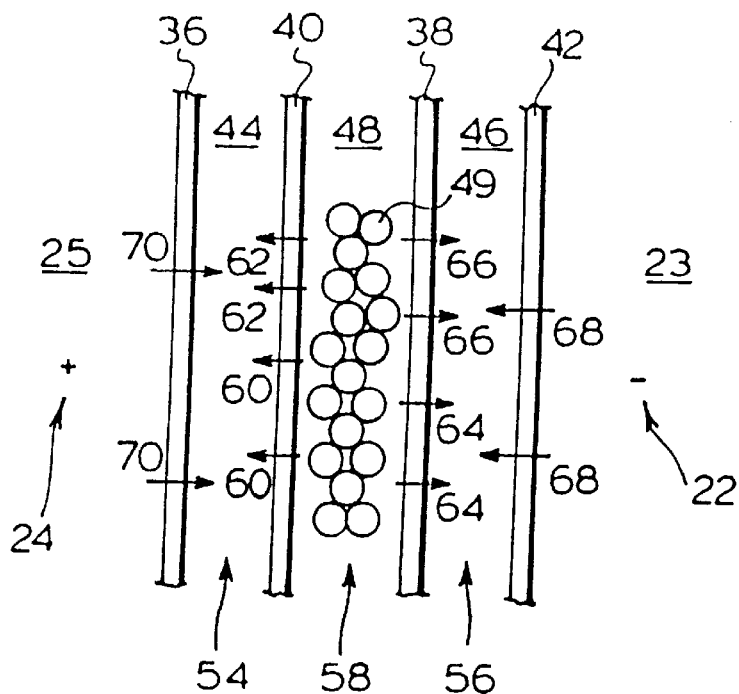
FIG. 2 is a fragmentary sectional view taken along line 2—2 of FIG. 1.

FIG. 2 shows representative concentrating compartments 44, 46 and a representative diluting compartment 48, between the concentrating compartments, in further detail. Cation permeable membranes 36 and 38 and anion permeable membranes 40 and 42 define the concentrating compartments and diluting compartments. Spacers (not shown) are placed between the membranes in the diluting compartments and concentrating compartments. The spacers in the diluting compartments 48 have openings for placement of ion exchange material such as ion exchange resin beads 49. It will be understood that ion exchange resin may also be placed within the concentrating compartments.

Figure 4:
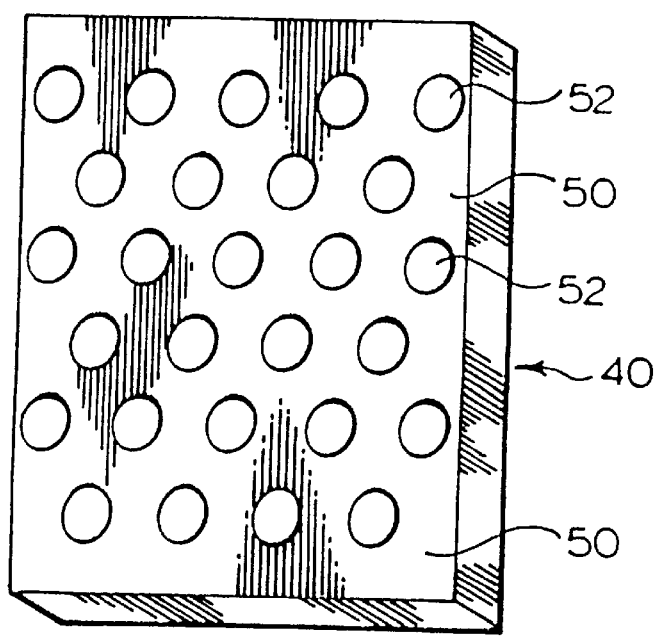
FIG. 4 is a perspective view of a preferred arrangement of ion exchange material of the invention.

FIG. 4 shows a preferred arrangement of ion exchange material of the present invention to be used within the diluting compartment 48 shown in FIG. 2. A bed 40 of porous and permeable continuous phase, i.e. matrix, of ion exchange material 50 has a plurality of spaced-apart cylinders of porous and permeable clusters of second ion exchange material 52 dispersed within matrix 50 transversely of the bed plane. The ion exchange materials 50 and 52 preferably are ion exchange resin particles in the form of beads. The ion exchange material 50 and ion exchange material 52 exchange oppositely charged ions. For example, if continuous phase ion exchange material 50 is a cation exchange material, which will have fixed negative charges to capture cations, dispersed phase ion exchange material 52 is an anion exchange material which will have fixed positive charges to capture anions. The transverse arrangement of clusters of the dispersed phased ion exchange material straddling or bridging the diluting compartments ensures that the aqueous liquid which flows within the diluting compartments 48 comes into contact with both forms of ion exchange resins to effectively exchange cations and anions. Referring to FIGS. 1, 2 and 4, aqueous liquid to be treated flows through the openings 26 and through the concentrating compartments 44 and 46 and the diluting compartment 48. Streams of liquid depicted by arrows 54 and 56 flow through the concentrating compartments 44 and 46 respectively and a stream of liquid depicted by arrow 58 flows through the diluting compartment 48. The aqueous liquid contains ions such as sodium and chloride ions.

Electric current flows between the cathode 22 in cathode compartment 23 and the anode 24 in anode compartment 25. The current across cathode 22 and anode 24 may be varied to control the overall efficiency of the electrodeionization process.

As the liquid to be purified flows through the diluting compartment 48 as depicted by arrow 58, it comes into contact with ion exchange resin beads, as in the arrangement such as shown in FIG. 4. Cation exchange resin 50 has fixed negative charges and captures cations such as sodium ions present in the liquid. Anion exchange resin 52 has fixed positive charges and captures anions such as chloride ions present in the liquid. As the ion exchange takes place between the liquid to be purified and the cation exchange resin beads 50 and the anion exchange resin beads 52, the voltage induces the non-desired cations and anions typified by sodium ions and chloride ions respectively to travel through membranes 38 and 40 and into the adjacent concentrating compartments 46 and 44. The ion exchange resin is disposed in a transverse arrangement relative to the flow of liquid by arrows 53 as shown in FIG. 4. This arrangement ensures that most of the liquid flowing through the diluting compartment 48 comes into contact with ion exchange material 50 and 52.

In the preferred embodiment for purifing water, the current induces some splitting of water into hydrogen and hydroxyl ions. The hydrogen ions are transported through the cation exchange resin 50 towards the cation exchange membrane 38, and through cation exchange membrane 38 into the concentrating compartment 46, as shown by arrows 66. The hydroxyl ions are transported through the anion exchange resin 52, towards anion permeable membrane 40, and through anion permeable membrane 40 into the concentrating compartment 44, as shown by arrows 62. Thus, the ion exchange resin material 50 and ion exchange resin material 52 are continuously regenerated.

Anionic impurities, for example chloride ions in the water to be purified in diluting chamber 48, are taken up by the anion exchange resin material 52, by the usual ion exchange mechanism, and are then transported along with hydroxyl ions through the anion exchange resin up to, and through anion permeable membrane 40, into concentrating compartment 44 as shown by arrows 60. At the same time, an equivalent amount of hydrogen ions and impurity cations is transported from an adjacent diluting compartment into concentrating chamber 44, as shown by arrows 70.

Cationic impurities, for example sodium ions, in the water to be purified in diluting chamber 48 are taken up by the cation exchange resin material 50, by the usual ion exchange mechanism, and are then transported along with the hydrogen ions through the cation exchange resin up to, and through cation permeable membrane 38, into concentrating compartment 46 as shown by arrows 64. At the same time, an equivalent amount of hydroxyl ions and impurity anions is transported from an adjacent diluting compartment into concentrating chamber 46, as shown by arrows 68.

The water flows through the concentrating compartments 44 and 46 to a waste tank (not shown) or is recycled. The purified water flowing through the diluting compartment 48 is recovered as product.

Figure 5:
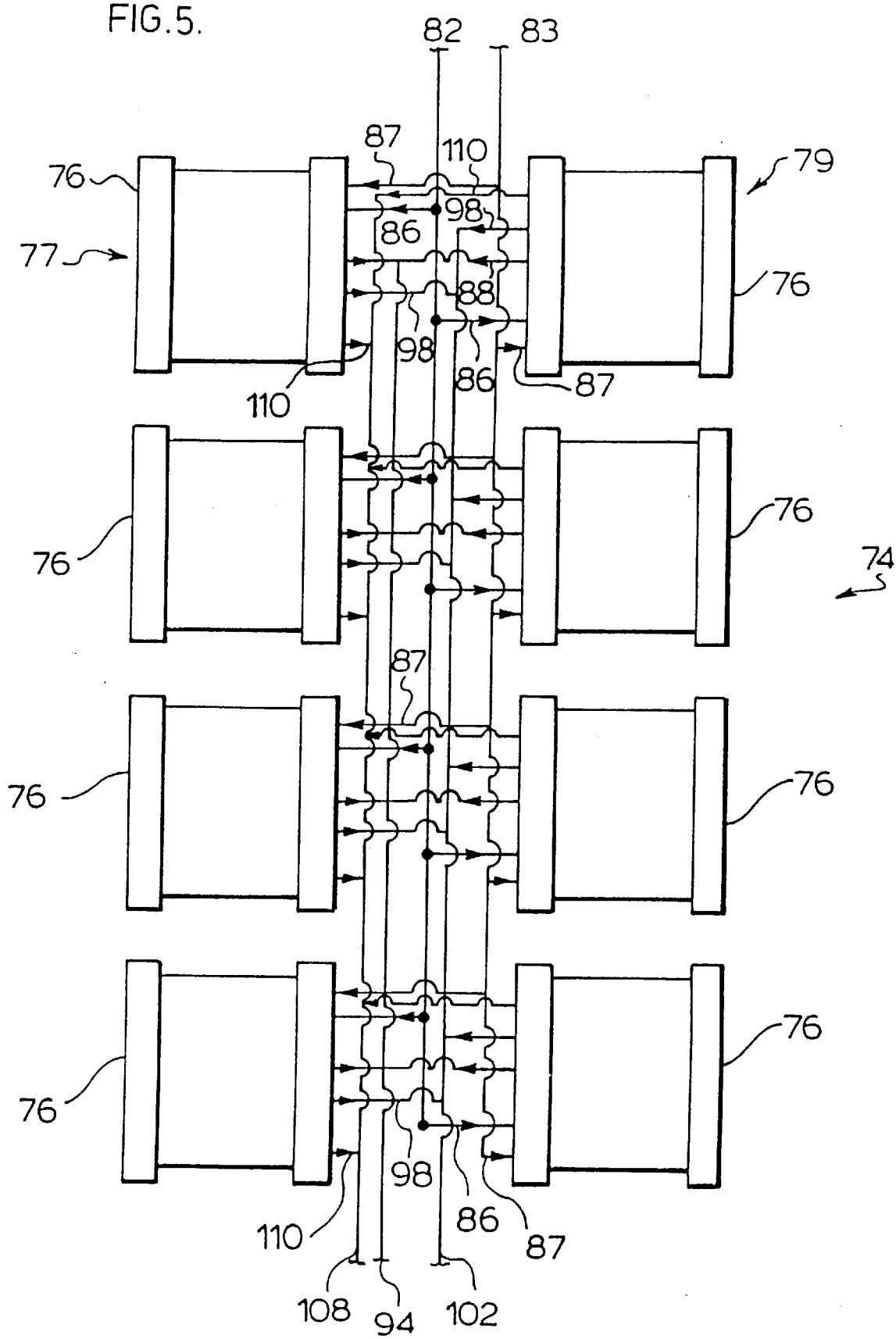
FIG. 5 is a top plan view, partially in schematic, of the apparatus of FIG. 3.

Referring now to FIGS. 3 and 5, the embodiment of the apparatus 74 of the present invention for the demineralization of a liquid such as water comprises a plurality of either electrodeionization or electrodialysis module units 76. In this embodiment, the modules 76 are arranged in a spaced-apart rows or racks 77 and 79.

Liquid to be treated flows through a feed conduit 80 in the direction as depicted by arrow 82 (FIGS. 3 and 5) between module rows 77 and 79. The feed conduit has a number of lateral connector conduits 84 which allow the liquid to flow in parallel into each of modules 76 in rows 77 and 79. The flow of liquid from the feed conduit into the modules 76 is depicted by arrows 86 in FIG. 5. At the same time, waste liquid flows through a waste conduit 81 in the direction as depicted by arrow 83 between rows 77 and 79 of modules 76. The waste conduit 81 has a number of lateral connector conduits 85 which allow the liquid to flow in parallel into the modules 76 in the direction as depicted by arrow 87.

After the liquid has been purified in the modules 76 as described above, it flows out of the modules 76 in rows 77 and 79 in parallel as depicted by arrows 88 in FIG. 5 through lateral conduits 90 into a product collection conduit 92. This is depicted by arrow 102 in FIG. 5. Waste from the diluting compartments flows out of modules 76 in parallel through conduits 96 shown by arrow 98 into a waste collection conduit for flow as depicted by arrow 100.

An electrolyte is passed through the compartments which contain the cathode and the anode. The electrolyte flows through a conduit 104 and through a number of lateral connector conduits 106 from the modules 76 in the rows 77 and 79 in the direction as depicted by arrows 108.

The modules in rows 77 and 79 preferably are separately electrically fused.

Figure 6:
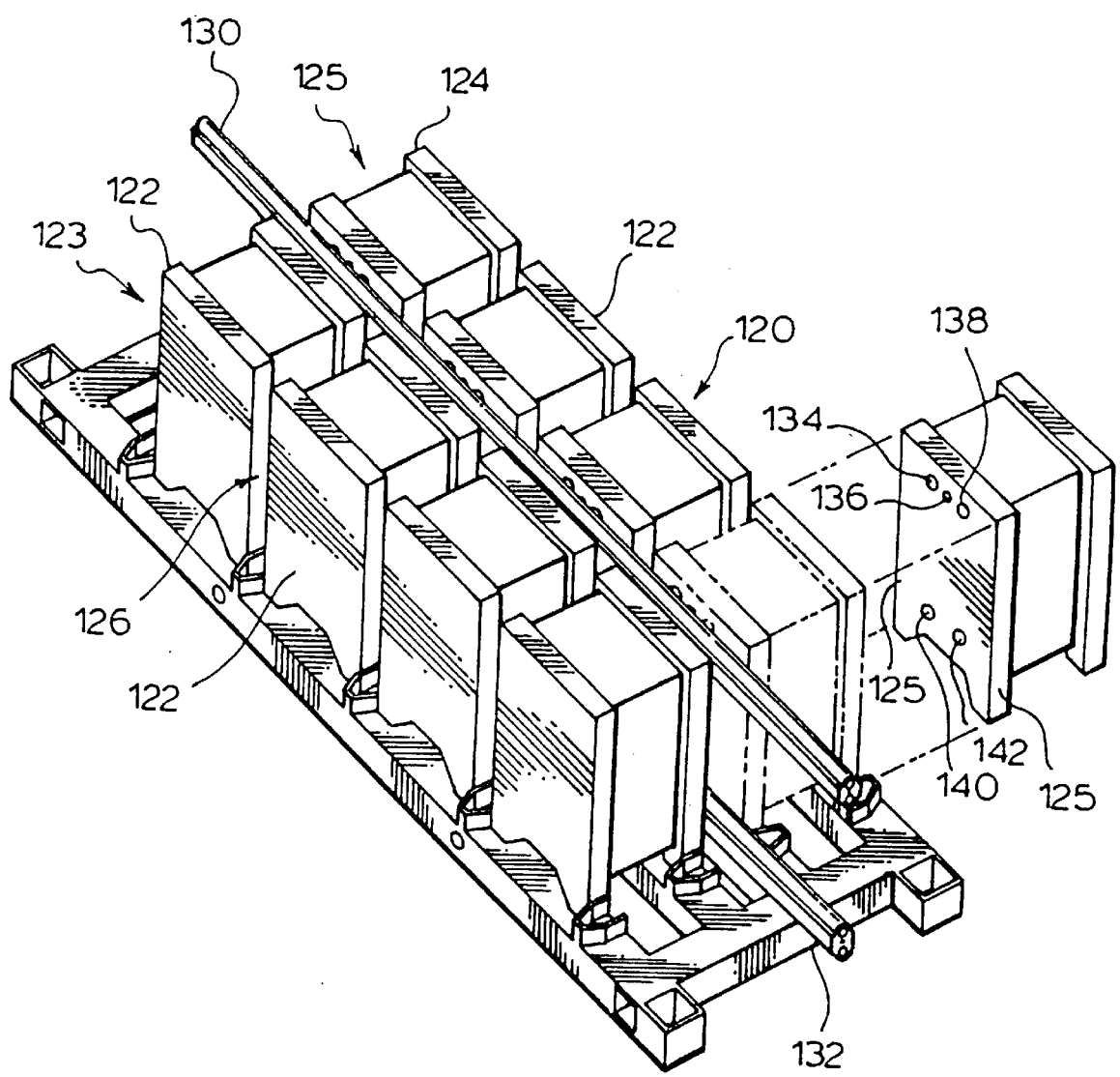
FIG. 6 is a perspective view of a second embodiment of the present invention.
Figure 7:
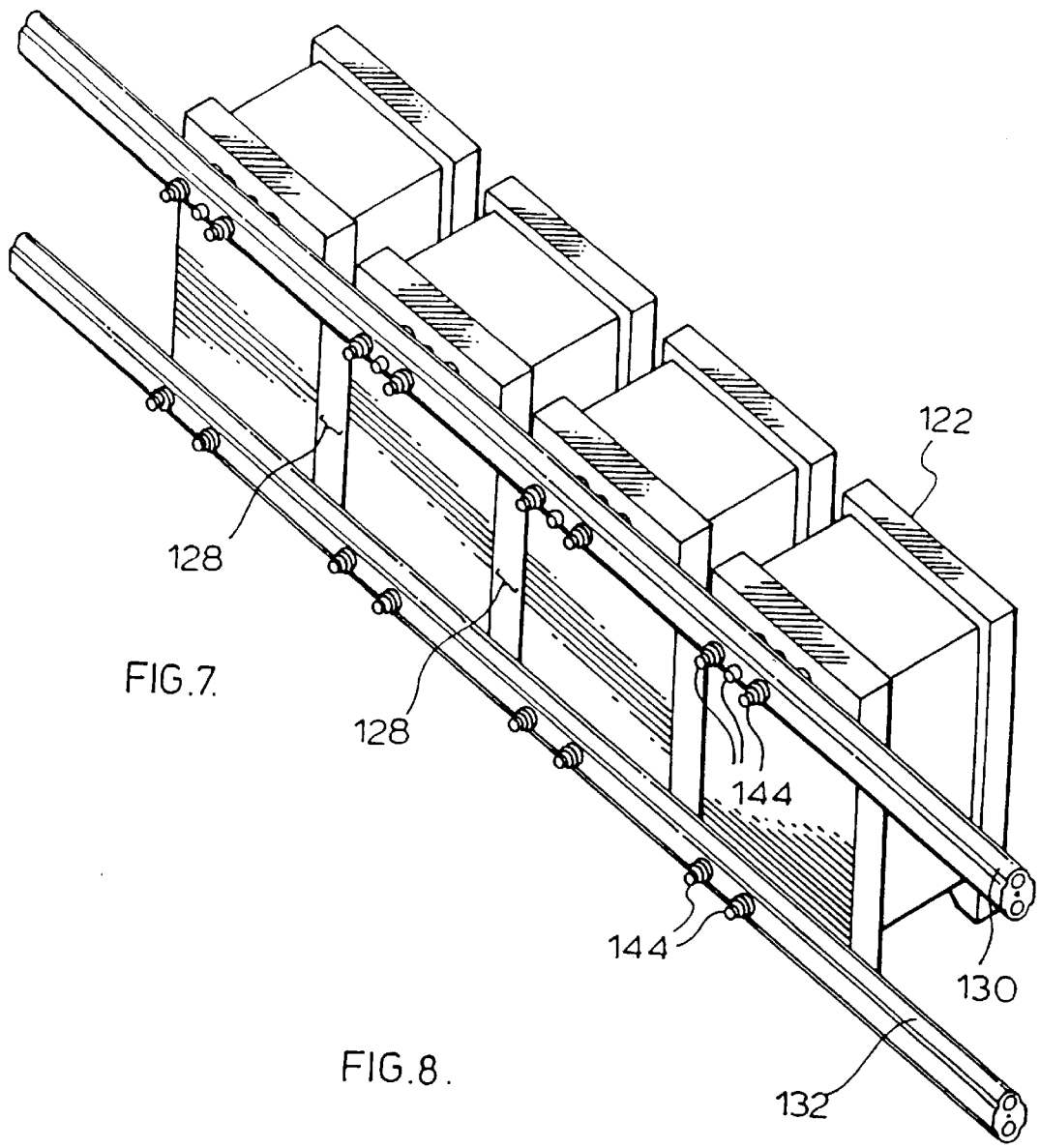
FIG. 7 is a perspective view of the apparatus of FIG. 6 with a row of modules removed to more clearly show the liquid manifolds.
Figure 8:
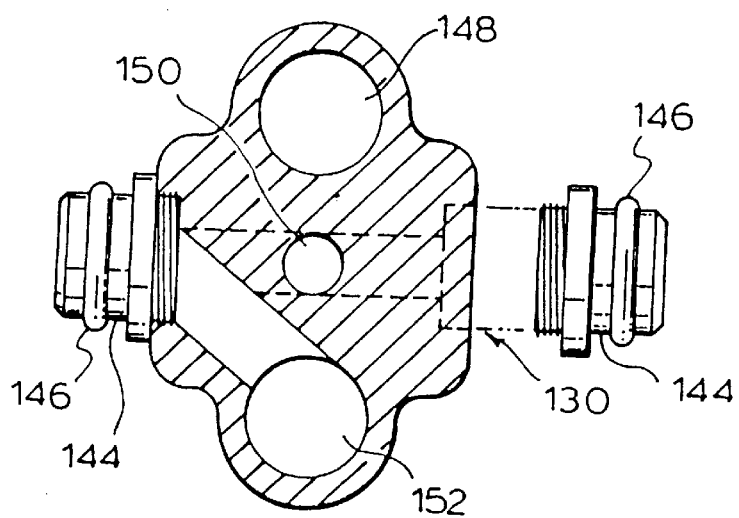
FIG. 8 is a sectional view, partly in elevation, of a manifold connector embodiment of the invention shown in FIG. 6.

FIGS. 6–8 show another embodiment of the apparatus 120 of the present invention. The apparatus 120 comprises a plurality of electrodionization modules or electrodialysis modules 122 arranged in rows 123 and 125.

FIG. 6 shows typical module 122 separated from the rack of modules. Module 122 has openings in one end plate 125 to allow for the flow of liquid from the modules 122 to manifolds 130 and 132. Openings 134, 136 and 138 allow for the streams of waste (concentrate), electrolyte and purified liquid respectively to flow from the modules into respective conduits in manifold 130. Opening 140 allows for the introduction of liquid to be purified and opening 142 permits introduction of liquid to pick up waste (concentrate) liquid. The manifolds 130 and 132 have connectors 144 for connection to the modules 122.

With reference now to FIG. 8, connector 144 is a short pipe with o-ring 146 which friction fits within the openings 134, 136, 138, 140 and 142 of the module 122 and maintains a liquid seal with manifolds 130 and 132. FIG. 8 shows a cross-section of the manifold 130 which has conduits 148, 150 and 152 corresponding to the flow of streams of purified liquid, electrolyte and waste, respectively.

Figure 9:
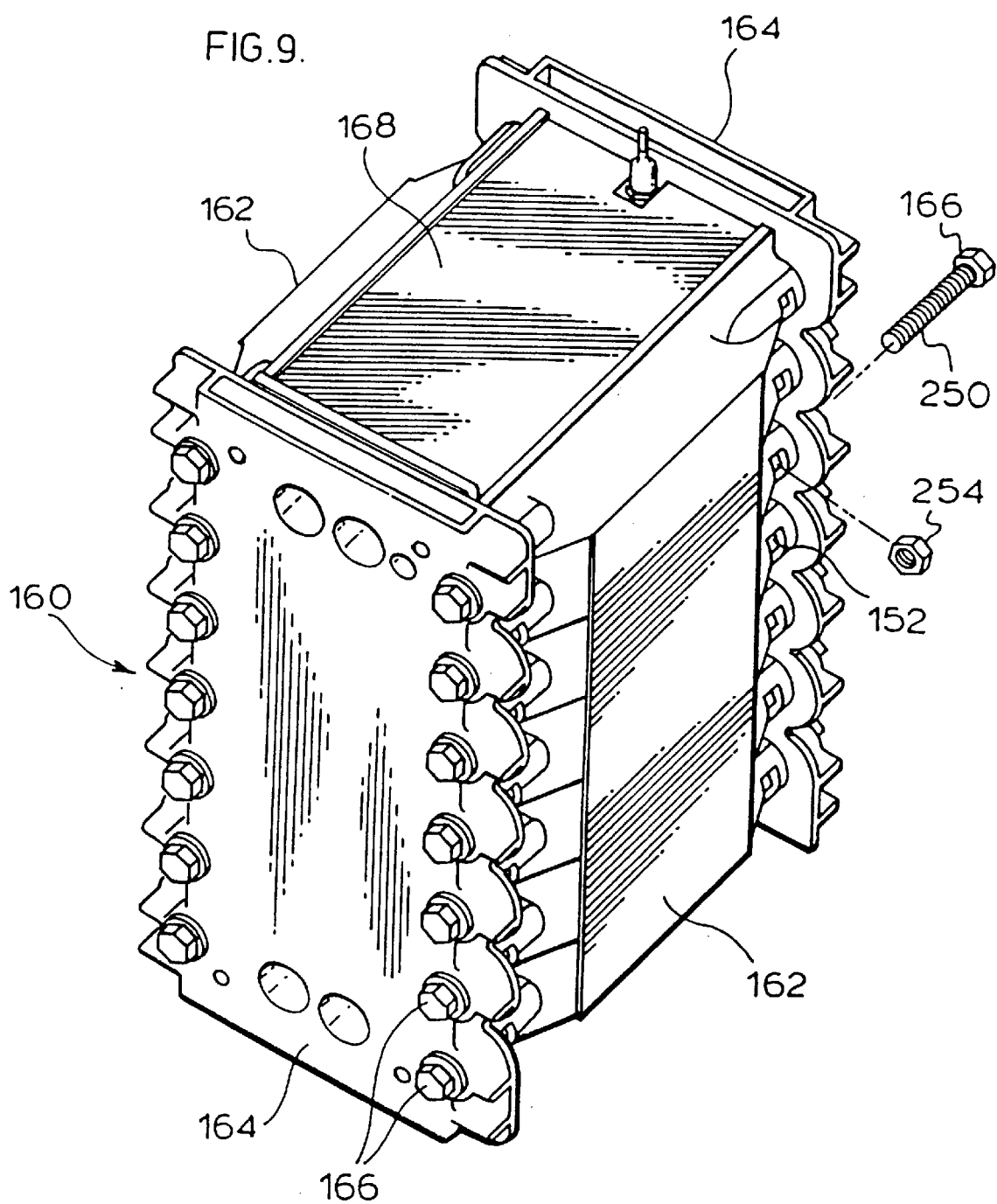
FIG. 9 is a perspective view of the housing of another embodiment of the invention.
Figure 10:
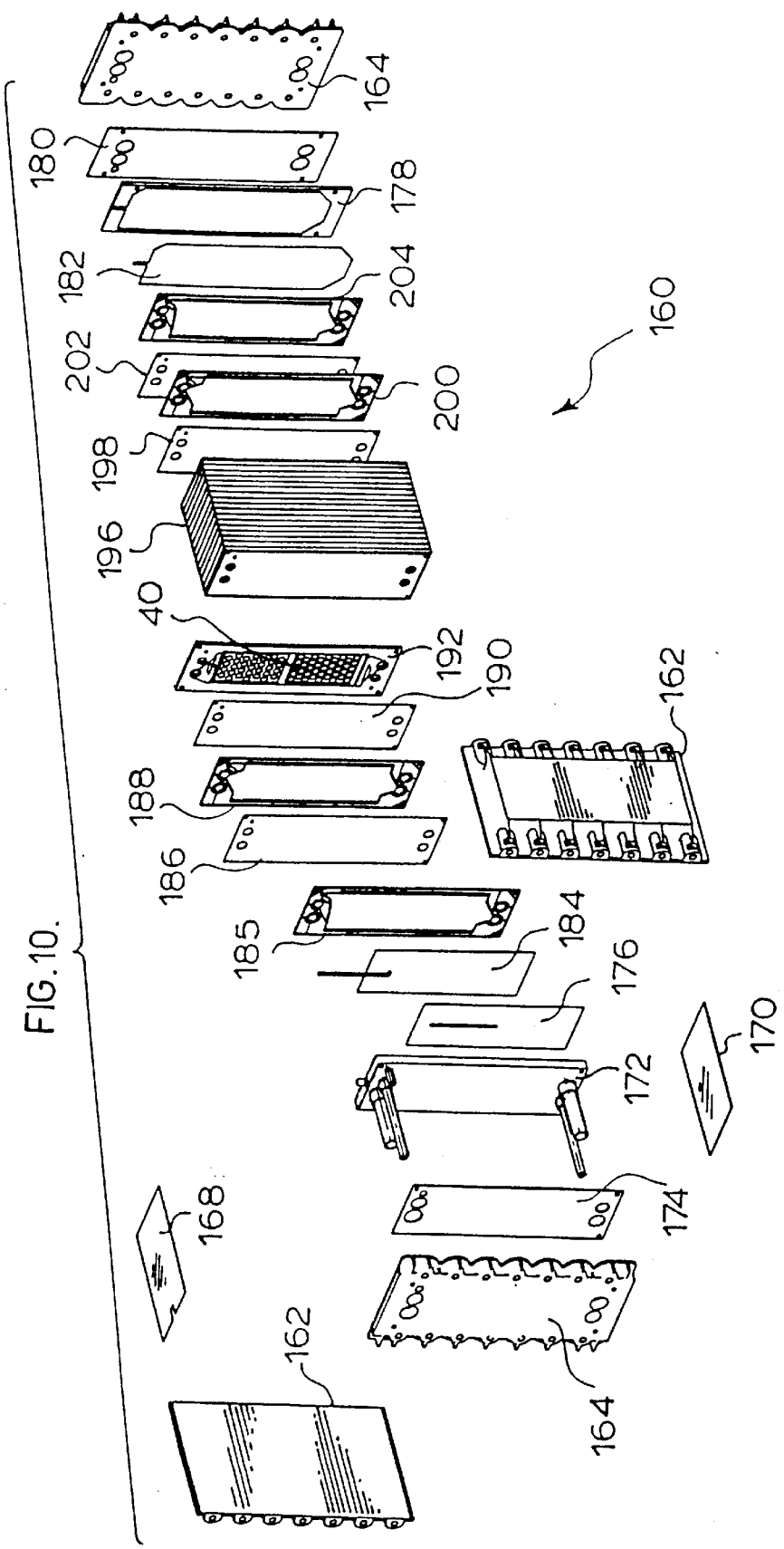
FIG. 10 is an exploded perspective view of the component of the embodiment shown in FIG. 9.

FIGS. 9–15 show another embodiment of the modular unit of the apparatus of the present invention. With reference to FIGS. 9 and 10, an embodiment of module housing 160 is shown having side plates 162 and end plates 164 joined by a plurality of bolts 166. Top and bottom plates 168, 170 seated into recesses in plates 168, 170 close the module. The housing plates are made of a material such as stainless steel or an aluminum alloy configured in box-like structures to be described to provide an assembly for a liquid-tight housing which encapsulates the interior components. A PVC insulating electrode block 172 having inlet and outlet pipes adjacent an end gasket 174 at one end houses a platinum coated titanium anode 176 and a PVC insulating electrode block 178 at the opposite end adjacent an end gasket 180 houses a stainless steel cathode 182. A polypropylene mesh electrode spacer 184, an electrode compartment spacer 185 and a cation permeable membrane 186 are located at the anode end of the module. Next, a concentrating compartment spacer 188 is adjacent an anion permeable membrane 190 which abuts a demineralizing or diluting compartment spacer 192 which houses ion exchange material i.e. ion exchanger 40, such as shown in FIG. 4. Spacers 188 and 192 may be injection molded polypropylene.

A plurality of diluting/concentrating pairs of compartments 196 comprise the central portion of the module. A cation permeable membrane 198 adjacent a concentrating compartment spacer 200, next to a cation permeable membrane 202 and an electrode compartment spacer 204, abut stainless steel cathode 182.

Figure 11:
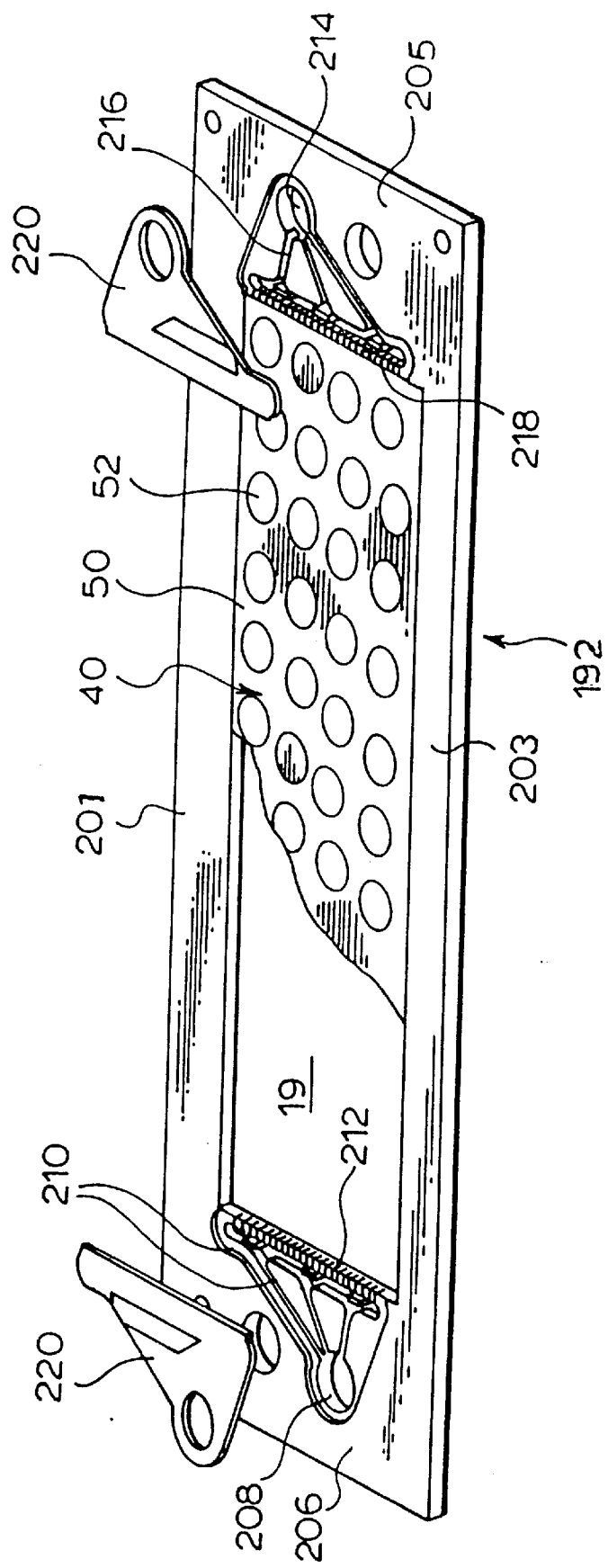
FIG. 11 is an enlarged perspective view of a preferred diluting compartment spacer of the invention shown in FIG. 10.

FIG. 11 illustrates a diluent spacer 192 containing within a cavity 199 defined by sides 201, 203 and ends 205, 206 an ion exchanger bed 40 having continuous phase of ion exchange material 50 and discrete spaced-apart cylinders or island clusters of a second ion exchange material 52, the cylinders 52 extending through bed 40 to be exposed on both sides thereof. The discrete island or clusters 52 may be formed from a shallow bed or sheet of a continuous phase of ion exchange resin particles of a first or second ion exchange material, preferably bonded by a polymeric binder, by die cutting clusters of the desired size and shape from the sheet. A sheet of a continuous phase of ion exchange resin particles of an ion exchange material having an opposite charge bonded by a polymeric resin having a plurality of holes corresponding in size and shape to the clusters 52 die cut therefrom, can receive the cut-out clusters 52 having the opposite charge in tight-fitting frictional engagement to form the ion exchangers. A thermoplastic polymeric binder such as a low density polyethylene, linear low density polyethylene, or the like, in an amount sufficient to form a cohesive sheet or bed structure suitable for handling, while retaining good porosity, liquid permeability and ion exchange capacity, can be used to form the starting sheets of the first and second ion exchange material. A liquid inlet port 208 is connected to cavity 198 by channels 210 terminating in a plurality of fine slit openings 212, openings 212 having a width smaller than the average size of the particles, e.g., ion exchange resin beads, which constitute the bed 40. The liquid discharge port 214 is connected to cavity 198 by channels 216 and a plurality of fine slit openings 218. Covers 220 close channels 210 and 216. Migration of the resin material thus is inhibited and the resin material is effectively contained within the diluent spacer during liquid flow.

Figure 12:
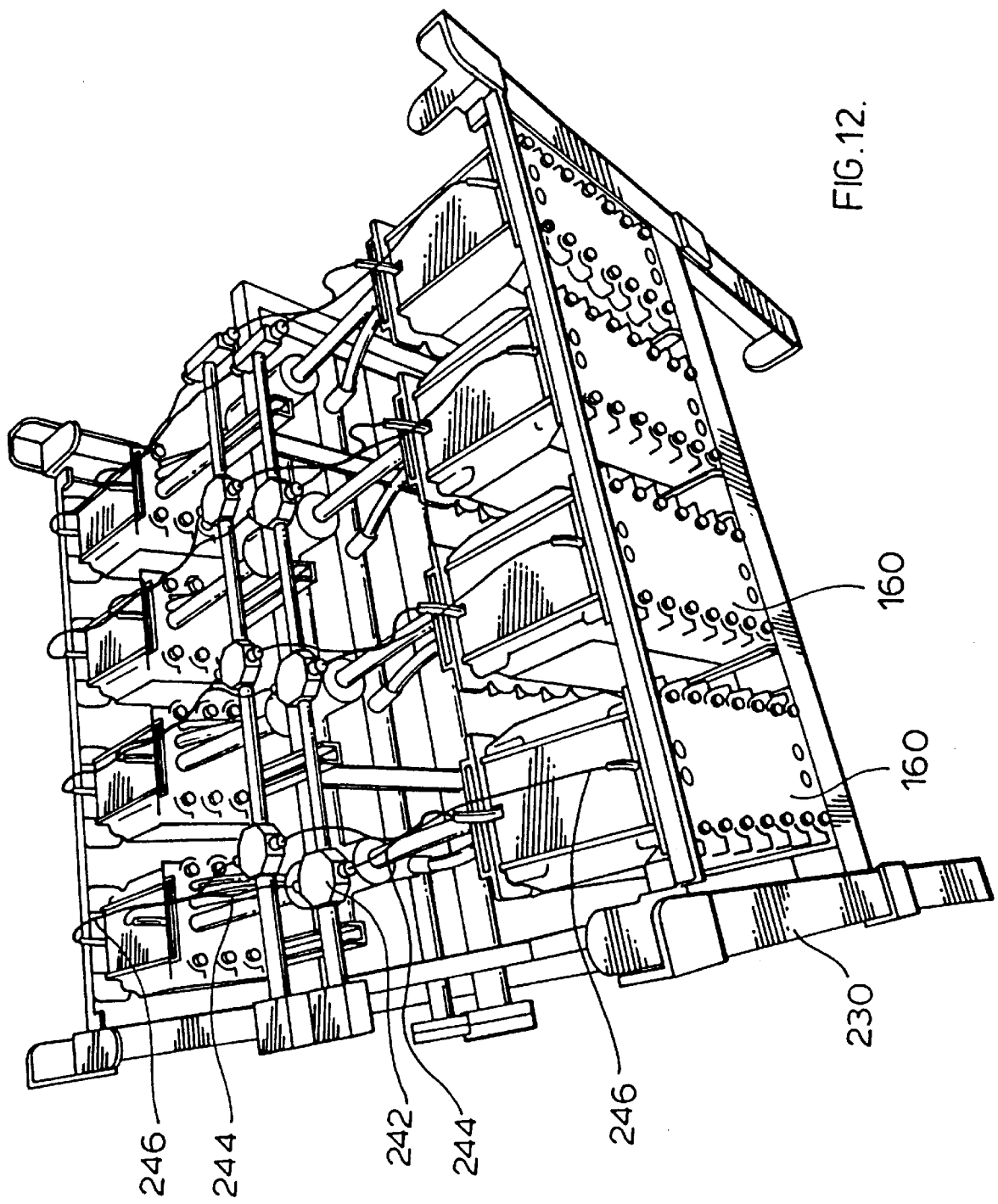
FIG. 12 is a perspective view of modular system of the invention showing the stacks of modular units arranged in racks.
Figure 13:
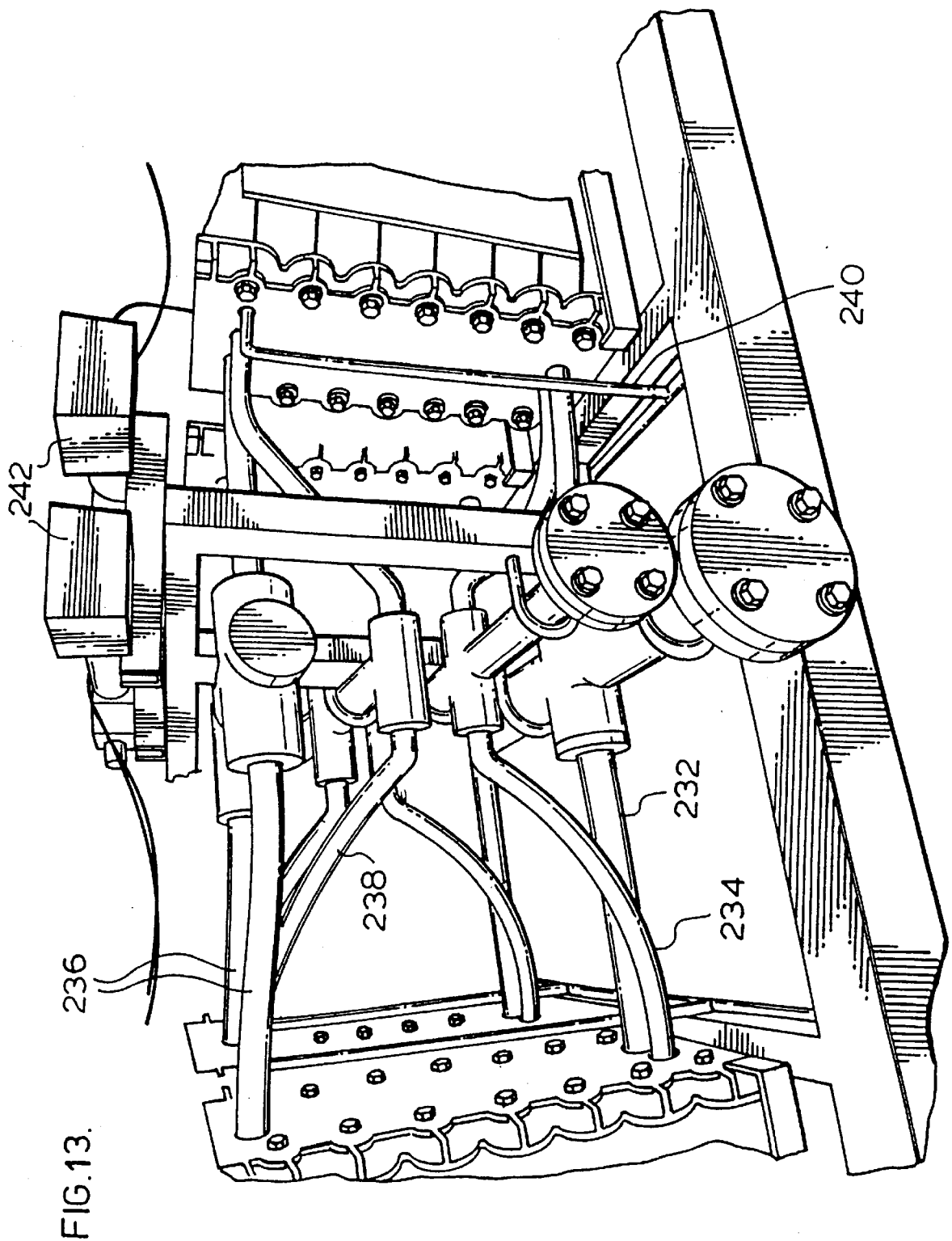
FIG. 13 is a perspective view of an embodiment of flow piping of the invention.

FIG. 12 illustrates a typical rack of modular units 160 mounted in a frame 230. FIG. 13 shows the plumbing; conduit 232 for aqueous liquid to be purified, conduit 234 for liquid to carry away impurities, conduit 236 for purified liquid, conduit 238 for waste liquid and conduit 240 for electrolyte. Junction boxes 242 provide the electrical connection to the anodes and cathodes by wires 244, 246 (FIG. 12) individually fused.

Figure 14:
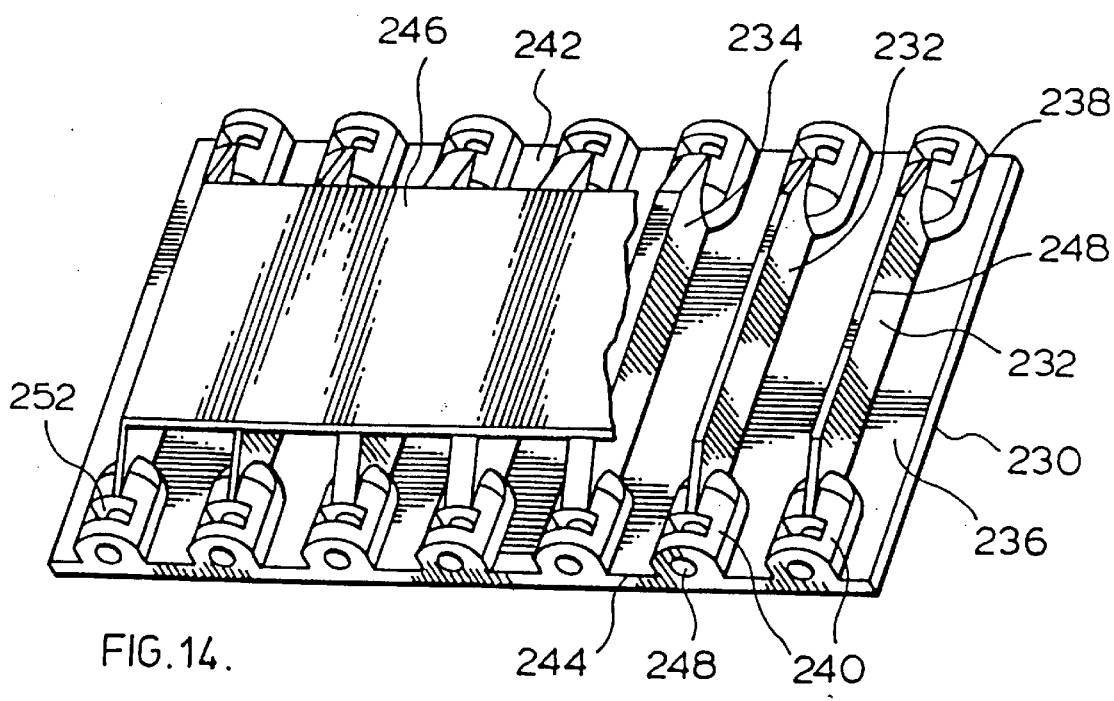
FIG. 14 is a perspective view, partly cut away, of a side plate of the module housing shown in FIG. 11.

Turning to FIG. 14, each side plate 162 is shown in more detail to comprise inner planar wall 230 and a plurality of transverse upstanding reinforcing ribs 232, 234 equispaced along the length of plate 162 on the outer surface 236 and formed integral therewith. Thin ribs 232 and thick central ribs 234 interconnect sockets 238, 240 formed at opposite side edges 242, 244 of plate 162. A rectangular cover plate 246 substantially co-extensive with and attached to the distal edges 248 of ribs 232, 234 forms a rigid box structure to effectively stiffen and reinforce side plate 162 from internal pressure.

Each of sockets 238, 240 comprises a slightly oversize hole 248 adapted to receive the shank 250 of bolt 166 (FIG.

9) and a slot 252 intersecting hole 248 adapted to receive a nut 254, typically a hexagonal nut, which is compatible with and receives bolt shank 250 in threaded engagement. The interior of slot 252 is shaped to include four sides of hexagon to receive and to centre nut 254 in axial alignment with hole 248 and to prevent rotation of nut 254 to allow bolt shank 250 to be threaded therein.

Figure 15:
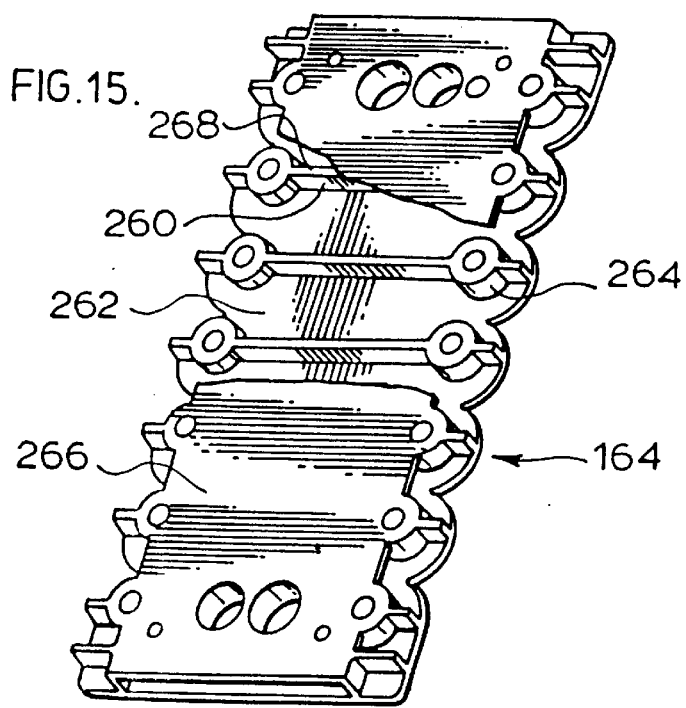
FIG. 15 is a perspective view, partly cut away, of an end plate of the module housing shown in FIG. 11.

Each end plate 164, shown in more detail in FIG. 15, has transverse upstanding reinforcing ribs 260 equispaced along the length of the plate on the outer surface 262 formed integral therewith to interconnect bosses 264 having holes for receiving bolts 166. A rectangular cover plate 266 substantially co-extensive therewith and attached to the distal edges 268 of ribs 260 forms a rigid box structure to effectively stiffen and reinforce end plate 164 from internal pressure.

The plurality of bolts 166 tightened to the desired torque level effectively secures end plates 164 to side plates 162 and locks top and bottom plates 168 in inner wall slots to provide an encapsulated, liquid-tight housing capable of effectively withstanding internal pressures of 150 psig, or more without leakage of liquid.

The modular system of the present invention provides a number of important advantages. The modular units are compact and can be carried by two people for installation or replacement. The compact units typically are liquid tight and provide effective encapsulation. The compact size allows for facile replacement, obviating the need for field servicing. The parallel arrangement of units allows increase or decrease of capacity by adding or deleting modular units. Failure of one unit does not shut down the system. Each configuration can be serviced by common piping, valves, pumps and the like for minimum capital expenditure and servicing costs. A system containing eight units, each producing nominally 12.5 U.S. gallons per minute (gpm), produces 100 gpm. Stacking of eight units on top of eight units would double production to 200 gpm. Configurations of 100, 300 and 600 U.S. gpm and larger are standard.

It will be understood, of course, that modifications can be made in the embodiment of the invention illustrated and described herein without departing from the scope and purview of the invention as defined by the appended claims.

We claim:

1. A portable modular unit for use in a modular system for demineralizing aqueous liquids comprising a rigid, compact housing (160), said housing having a pair of opposite end plates (164), a pair of opposite side plates (162), a top plate and a bottom plate (170), and connector means (166) for joining said end plates (164) to the side and plates (162) and for securing the top and bottom plates (168, 170) thereto to form a liquid-tight encapsulating enclosure; said housing (160) containing an anode compartment having an anode (176) and a cathode compartment having a cathode (182), a plurality of cation exchange membranes (186) and anion exchange membranes (190) which are alternately arranged between the anode compartment and the cathode compartment to form demineralizing compartments each defined by a demineralizing compartment spacer (192) having an anion exchange membrane (190) on the anode side and by a cation exchange membrane (186) on the cathode side, and concentrating compartments (196) each defined by a concentrating compartment spacer (200) having a cation exchange membrane (198) on the anode side and by an anion exchange membrane (202) on the cathode side, each demineralizing compartment spacer (192) having an elongated central cavity (199) for receiving porous and permeable ion exchanger (40), said spacer having a liquid inlet port (208) at one end and a liquid outlet port (214) at the opposite end, a plurality of fine slit openings (212, 218) formed in the spacer (192) at each end adjacent the cavity (199), and at least one channel (210) in the spacer (192) at each end for interconnecting the liquid inlet port (208) to the fine slit openings (212) adjacent the cavity (199) at one end and for connecting the liquid outlet port (214) to the fine slit openings (218) adjacent the cavity (199) at the other end, whereby an aqueous liquid can be flowed through the porous and permeable ion exchanger (40) filling the demineralizing compartment, a porous and permeable ion exchanger (40) filling said demineralizing compartments, said ion exchanger (40) consisting of a porous and permeable continuous phase (50) of one of cation exchange resin particles or anion exchange resin particles and a porous and permeable dispersed phase of clusters (52) of the other of the cation exchange resin particles or the anion exchange resin particles in the continuous phase (50), and means (144) for releasably connecting the modular unit to a piping system in a modular system whereby the modular unit can be removed from or added to the modular system.

2. A modular unit as claimed in claim 1 in which the fine slit opening (212, 218) have a width smaller than the average size of the cation or anion resin particles whereby migration of the resin particles is inhibited during liquid flow.

3. A modular unit as claimed in claim 1 in which each of the end plates (164) and the side plates (162) has an outer surface (236) and has a plurality of transverse upstanding reinforcing ribs (232, 234) equispaced along the said outer surface (236) formed integral therewith, and a cover plate (246) substantially co-extensive with an attached to the distal edges (248) of the reinforcing ribs (232, 234) to form a rigid box structure therewith for stiffening and reinforcing the plates (164) from internal pressure.

4. A modular unit as claimed in claim 3 in which each said side plate (162) has a socket (238, 240) formed integral therewith on the outer surface adjacent opposite side edges thereof as an extension of a transverse rib (232, 234) at each end thereof, each said socket (238, 240) having a longitudinal hole (248) therein for loosely receiving a threaded bolt shank (250) and a slot (252) intersecting the hole (248) adapted to receive a nut (254) compatible with the threaded bolt shank, said slot (252) having an interior shape for receiving the nut (254) in axial alignment with the bolt (250) for threading the bolt into the nut.

5. A modular unit as claimed in claim 4 in which each said end plate (164) has a boss (264) formed on the outer surface adjacent opposite sides thereof at each end of a transverse rib (260), each said boss (264) having a hole for receiving a bolt (166) in alignment with a mating socket (238, 240) in a side plate (162).

6. A modular system for demineralizing aqueous liquids comprising a plurality of portable modular (160) units as claimed in claim 1, 2, 3, 4 or 5 in which said portable modular units are arranged in parallel, a piping system for feeding an aqueous liquid to be demineralized (232) in parallel to the modular units (160) and for removing demineralized aqueous liquid (236) and a concentrated waste liquid (234) in parallel from the modular units (160), means (242) for applying an electrical voltage between the anode and The cathode, and means (144) for removably connecting the modular units (160) to the piping system for facile adding of a modular unit (160) to the system or removal of the modular unit (160) from the system.

7. A modular system as claimed in claim 6 in which the means for removably correcting the modular units is a quick release securement means (144).

8. A portable modular unit for use in a modular system for demineralizing aqueous liquids comprising a rigid, compact housing (160), said housing having a pair of opposite end plates (164), a pair of opposite side plates (162), a top plate and a bottom plate (170), and connector means (166) for joining said end plates (164) to the side plates (162) and for securing the top and bottom plates (168, 170) thereto to form a liquid-tight encapsulating enclosure; said housing (160) containing an anode compartment including an anode (176) and a cathode compartment including a cathode (182), a plurality of cation exchange membranes (186) and anion exchange membranes (190) which are alternately arranged between the anode compartment and the cathode compartment to form demineralizing compartments each defined by a demineralizing compartment spacer (192) including an anion exchange membrane (190) on the anode side and a cation exchange membrane (186) on the cathode side, and concentrating components each defined by a concentrating compartment spacer (200) including a cation exchange membrane (198) on the anode side and by an anion exchange membrane (202) on the cathode side, and a porous and permeable ion exchanger (40) filing said demineralizing components, and means (144) for releasably connecting the modular unit to a piping system in a modular system whereby the modular unit can be removed from or added to the modular system.

9. A modular unit as claimed in claim 8 in which each demineralizing compartment comprises a demineralizing compartment spacer (192) including an elongated central cavity (199) for receiving the porous and permeable ion exchanger (40), said spacer (192) including a liquid inlet port (208) at one end and a liquid outlet port (214) at the opposite end, a plurality of fine slit openings (212,218) formed in the spacer (192) at each end adjacent the cavity (199), and at least one channel (210) in the spacer at each end for interconnecting the liquid inlet port (208) to the fine slit openings (212, 218) adjacent the cavity (199) and for connecting tee liquid outlet port (214) to the fine slit openings (212,218), whereby an aqueous liquid can be flowed through the porous and permeable ion exchanger (40) filling the demineralizing component.

10. A modular unit as claimed in claim 9 in which the fine slit opening (212,218) include a width smaller than the average size of the cation or anion resin particles whereby migration of the resin particles is inhibited during liquid flow.

11. A modular unit as claimed in claim 8 in which each of The end plates (164) and The side plates (162) includes a surface (236) including a plurality of transverse upstanding reinforcing ribs (232,234) equispaced along the said outer surface (236) formed integral therewith.

12. A modular unit as claimed in claim 8 in which each of the end plates (164) and the side plates (162) includes an outer surface (236) and includes a plurality of transverse upstanding reinforcing ribs (232, 234) equispaced along the said outer surface (236) formed integral therewith.

13. The modular unit a claimed in claim 12 in which each of the end plates (164) and the side plates (162) include a cover plate (246) substantially co-extensive with and attached to the distal edges (248) of the reinforcing ribs (232, 234) to form a rigid box structure therewith.

14. The modular unit as claimed in claim 12 in which each said side plate includes a socket formed integral Therewith on the outer surface adjacent opposite side edges thereof, each said socket including a longitudinal hole therein for loosely receiving a thread bolt shank and a slot intersecting The hole adapted to receive a nut compatible with the threaded bolt shank, said slot having an interior shape for receiving the nut in axial alignment with the bolt for Threading the bolt into the nut.

15. The modular unit as claimed in claim 14 in which each said end plate includes a boss formed on the outer surface adjacent opposite sides thereof at each end of a transverse rib, each said boss including a hole for receiving a bolt in alignment with the mating socket in a side plate.

16. A modular unit as claimed in claim 8 in which each said side plate (162) includes a socket (238, 240) formed integral therewith on the outer surface adjacent opposite side edges thereof.

17. The modular unit as claimed in claim 16 in which each said socket includes a longitudinal hole (248) therein for loosely receiving a threaded bolt shank (250) and a slot (252) intersecting the hole (248) adapted to receive a nut (254) compatible with the threaded bolt shank (250), said slot (252) including an interior shape for receiving the nut (254) in axial alignment with the bolt (250) for threading the bolt (250) into the nut (254).

18. A modular unit as claimed in claim 17 in which each said end plate (164) includes a boss (264) formed on the outer surface adjacent opposite sides thereof at each end of a transverse rib (260), each said boss (264) includes a hole for receiving a bolt (166) in alignment with a mating socket (238, 240) in a side plate (162).

19. The modular unit as claimed in claim 16 in which each said end plate (164) includes a boss (264) including a hole (248) for receiving a bolt (250) in alignment with a mating socket (238, 240) in a side plate (162).

* * * * *